United States Patent
Miller et al.

(10) Patent No.: US 7,930,637 B2
(45) Date of Patent: *Apr. 19, 2011

(54) INTELLIGENT AGENDA OBJECT FOR A PRESENTATION APPLICATION

(75) Inventors: Steven M. Miller, Cary, NC (US); Priyanka Jain, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/542,590

(22) Filed: Aug. 17, 2009

(65) Prior Publication Data
US 2009/0300501 A1      Dec. 3, 2009

Related U.S. Application Data

(63) Continuation of application No. 10/753,297, filed on Jan. 8, 2004, now Pat. No. 7,620,896.

(51) Int. Cl.
*G06F 3/00* (2006.01)
(52) U.S. Cl. ......... 715/730; 715/731; 715/732; 715/817
(58) Field of Classification Search .......... 715/730–731, 715/254, 705–713, 732, 772, 817–820
See application file for complete search history.

(56) References Cited

U.S. PATENT DOCUMENTS

| | | | |
|---|---|---|---|
| 5,619,631 A | | 4/1997 | Schott |
| 5,845,299 A | * | 12/1998 | Arora et al. .......... 715/209 |
| 5,917,480 A | | 6/1999 | Tafoya et al. |
| 6,037,943 A | | 3/2000 | Crone et al. |
| 6,154,757 A | | 11/2000 | Krause et al. |
| 6,380,957 B1 | | 4/2002 | Banning |
| 6,452,615 B1 | | 9/2002 | Chiu et al. |
| 6,590,586 B1 | | 7/2003 | Swenton-Wall et al. |
| 6,665,835 B1 | | 12/2003 | Gutfreund et al. |

(Continued)

FOREIGN PATENT DOCUMENTS
EP     0685955 A2     12/1995

(Continued)

OTHER PUBLICATIONS

IBM Corporation, Research Disclosure, Kenneth Mason Publications, Hampshire, GB. "Thumbnail Web Page", vol. 452, No. 89, Dec. 2001, XP007129444.

(Continued)

*Primary Examiner* — Boris Peslin
*Assistant Examiner* — William Wong
(74) *Attorney, Agent, or Firm* — Lee Law, PLLC; Christopher B. Lee

(57) ABSTRACT

A system includes a memory, a display, and a processor programmed to load a configuration program and an intelligent agenda program into the memory. The intelligent agenda program is adapted to interface with a slide presentation program and respond to a plurality of user inputs to a graphical user interface of the configuration program to create an intelligent agenda. The intelligent agenda is modified when the user selects the first display option to display only the title in the outline corresponding to the currently displayed slide, a preceding title located immediately before the title, and a following title located immediately after the title. The intelligent agenda is further modified when the user selects the second display option to limit a number of displayed lines of the outline to a line limitation.

20 Claims, 17 Drawing Sheets

U.S. PATENT DOCUMENTS

| | | | |
|---|---|---|---|
| 6,788,319 B2 | 9/2004 | Matsumoto et al. | |
| 6,789,228 B1 | 9/2004 | Merril et al. | |
| 6,802,041 B1 | 10/2004 | Rehm | |
| 6,834,371 B1 | 12/2004 | Jensen et al. | |
| 6,944,830 B2 | 9/2005 | Card et al. | |
| 6,948,125 B2 | 9/2005 | Detweiler et al. | |
| 7,119,818 B2* | 10/2006 | Takiguchi | 715/764 |
| 7,281,199 B1 | 10/2007 | Nicol et al. | |
| 7,383,509 B2* | 6/2008 | Foote et al. | 715/731 |
| 2001/0033296 A1 | 10/2001 | Fullerton et al. | |
| 2002/0018075 A1 | 2/2002 | Maulik et al. | |
| 2002/0026521 A1 | 2/2002 | Sharfman et al. | |
| 2002/0082955 A1 | 6/2002 | Patel et al. | |
| 2002/0109712 A1 | 8/2002 | Yacovone et al. | |
| 2002/0133520 A1 | 9/2002 | Tanner | |
| 2002/0163548 A1 | 11/2002 | Chiu et al. | |
| 2002/0164151 A1 | 11/2002 | Jasinschi et al. | |
| 2002/0165721 A1 | 11/2002 | Chang | |
| 2002/0186236 A1 | 12/2002 | Brown et al. | |
| 2002/0191013 A1 | 12/2002 | Abrams | |
| 2003/0024975 A1 | 2/2003 | Rajasekharan | |
| 2003/0028562 A1* | 2/2003 | Shaughnessy et al. | 707/513 |
| 2003/0048291 A1 | 3/2003 | Dieberger | |
| 2003/0085916 A1* | 5/2003 | Thiry et al. | 345/738 |
| 2003/0086682 A1 | 5/2003 | Schofield et al. | |
| 2003/0090506 A1* | 5/2003 | Moore et al. | 345/730 |
| 2003/0122863 A1 | 7/2003 | Dieberger et al. | |
| 2003/0155413 A1 | 8/2003 | Kovesdi et al. | |
| 2003/0160814 A1 | 8/2003 | Brown | |
| 2003/0202019 A1 | 10/2003 | Detweiler et al. | |
| 2003/0218639 A1 | 11/2003 | Lee et al. | |
| 2004/0001106 A1 | 1/2004 | Deutscher et al. | |
| 2004/0080528 A1* | 4/2004 | Rand et al. | 345/738 |
| 2004/0104946 A1 | 6/2004 | Li | |
| 2004/0125129 A1* | 7/2004 | Marsh | 345/731 |
| 2004/0205536 A1* | 10/2004 | Newman et al. | 715/509 |
| 2005/0039131 A1 | 2/2005 | Paul | |
| 2005/0076312 A1 | 4/2005 | Gardner et al. | |
| 2005/0091579 A1 | 4/2005 | Mewherter et al. | |
| 2005/0097470 A1 | 5/2005 | Dias et al. | |
| 2005/0120239 A1 | 6/2005 | Monroe et al. | |
| 2005/0138570 A1 | 6/2005 | Good et al. | |
| 2005/0154995 A1* | 7/2005 | Miller et al. | 715/772 |
| 2005/0216431 A1 | 9/2005 | Baker et al. | |
| 2005/0223314 A1 | 10/2005 | Varadarajan et al. | |
| 2005/0251731 A1 | 11/2005 | Valderas et al. | |
| 2005/0268234 A1* | 12/2005 | Rossi et al. | 715/705 |
| 2006/0008789 A1 | 1/2006 | Gerteis | |
| 2006/0048058 A1 | 3/2006 | O'Neal et al. | |
| 2006/0059441 A1 | 3/2006 | Todd | |
| 2006/0080610 A1 | 4/2006 | Kaminsky | |
| 2006/0200455 A1 | 9/2006 | Wilson | |
| 2007/0198930 A1 | 8/2007 | Chu et al. | |
| 2007/0266321 A1 | 11/2007 | Bicker et al. | |

FOREIGN PATENT DOCUMENTS

| | | |
|---|---|---|
| JP | 12-047999 A | 2/2000 |
| JP | 2000259135 A | 1/2001 |

OTHER PUBLICATIONS

"Displaying Web Pages in Frames", Anonymous: IBM Technical Disclosure Bulletin, vol. 40, No. 11, Nov. 1, 1997, p. 95, XP002326711.

Good, L. and Bederson, B. B., 2002. Zoomable User Interfaces as a Medium for Slide Show Presentations. Information Vizualization 1, (Mar. 1, 2002), 35-49. DOI=http://dx.doi.org/10.1057/palgrave/ivs/9200004.

Microsoft, Microsoft PowerPoint 2000, screen printout pp. 1-14.

European Patent Office, Communication Pursuant to Article 94(3) EPC, Examination Report for Application No.: 05707742.2, Jul. 22, 2010, pp. 1-7, Berlin, Germany.

* cited by examiner

INTELLIGENT AGENDA OBJECT FOR A PRESENTATION APPLICATION

RELATED APPLICATIONS

This application is a continuation of and claims priority to and claims the benefit of U.S. patent application Ser. No. 10/753,297 titled "INTELLIGENT AGENDA OBJECT FOR SHOWING CONTEXTUAL LOCATION WITHIN A PRESENTATION APPLICATION," which was filed in the U.S. Patent and Trademark Office on Jan. 8, 2004, and which is incorporated herein by reference in its entirety.

BACKGROUND

The present invention is directed generally at computer programs for slide shows and presentations and specifically at a computer program for displaying and updating an outline on the slides.

Presentation programs such as MICROSOFT® POWERPOINT® and LOTUS® FREELANCE GRAPHICS® are well known in the art. The generally accepted method of use of a presentation program is for the user to create a presentation in the form of a slide show on the presentation program. The user may then display the slide show in a presentation to an audience. When the user presents the slide show to the audience, it is useful for the audience to be able to determine the speaker's current contextual position in the slide show. The contextual location is the location of the current slide within the context of all of the topics within the presentation. Knowledge of the speaker's current contextual position in the slide show can add meaning to and increase the audience's ability to understand the information conveyed in the current slide. Currently, the audience has no way of keeping track of the speaker's current contextual position in the presentation. Therefore, a need exists for an apparatus that informs the audience of the speaker's current contextual position in the presentation.

Many presentation programs allow a user to place page numbers on the slides. Placing page numbers on the slides tells the audience how many pages have passed (i.e. the physical position), but does not convey any contextual information regarding the presentation. Even when the page numbers use the "Page X of Y" format, the page numbers do not convey any contextual information and can be misleading because the speaker can spend more time discussing some slides than others. An outline-type format is better suited for conveying contextual location information to an audience. Therefore, a need exists for a method of indicating the contextual location of the current slide in an outline format to the audience.

ADOBE® documents can be configured with an outline that displays contextual information for a static printed or electronic document. The outline contains the topics that have preceded the current topic and the topics that will follow the immediate topic. The outline is initially contracted, but the outline topics may be expanded by the reader. The ADOBE® outline is useful for static documents because the reader can review the document at leisure and has complete control over the document. However, the ADOBE® outline is not suitable for dynamic presentations, such as slide shows presented to an audience, because the ADOBE® software does not include presentation features, such as adding videos or sounds to the slides, and does not allow the speaker to make the slides animated or interactive.

Consequently, a need exists in the art for a method of informing an audience of the speaker's current position in a slide show. The need extends to a method of informing the audience in an outline format that is easy for the audience to follow. A need also exists for an outline in which the speaker can control the expansion and contraction of the outline. Finally, a need exists for an automated method for generating the outline from the slides in the slide show.

SUMMARY

The present invention, which meets the needs identified above, is a system and computer program product for displaying a slide show containing an outline that follows the progression of the user's presentation. The software embodiment of the present invention comprises a Configuration Program (CP) and an Intelligent Agenda Program (IAP). The CP allows the user to configure the intelligent agenda of the present invention. The user can configure the colors and lines for the intelligent agenda, the size of the intelligent agenda, the layout of the intelligent agenda, the picture in the background of the intelligent agenda, the text box of the intelligent agenda, the web options for the intelligent agenda, and the display options for the intelligent agenda. When configuring the display options, the user can configure the expansion of the outline on the intelligent agenda, limit the number of displayed lines in the intelligent agenda, and limit the topics displayed on the intelligent agenda.

The IAP runs whenever the user runs the presentation program associated with the present invention. If the user has not configured the intelligent agenda, the IAP displays the selected slide and the entire expanded outline as a default. If the user has configured the intelligent agenda, then the IAP displays the outline according to the expansion configuration and modifies the outline based on the configuration limitations defined by the user. The user may navigate the slides as he would in the absence of the present invention. The intelligent agenda of the present invention tracks the user's progression through the presentation and indicates to the audience the contextual location of the current topic in the presentation outline.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

As used herein, the term "above" shall refer to a topic that is the main topic or a higher sub-topic for the current topic.

As used herein, the term "adjacent" shall mean a topic immediately before or immediately after a current topic.

As used herein, the term "below" shall mean a sub-topic for the current topic, regardless of whether the current topic is a main topic or a sub-topic.

As used herein, the term "computer" shall mean a machine having a processor, a memory, and an operating system, capable of interaction with a user or other computer, and shall include without limitation desktop computers, notebook computers, personal digital assistants (PDAs), servers, handheld computers, and similar devices.

As used herein, the term "main topic" shall mean a topic that introduces a new subject and that does not have any higher topics.

As used herein, the term "next" shall mean proceeding from a current topic to the subsequent topic.

As used herein, the term "presentation program" shall mean a computer program for displaying a slide show.

As used herein, the term "previous" shall mean returning to an immediately prior topic from a current topic.

As used herein, the term "sub-topic" shall mean a slide that elaborates on the subject matter in the main topic slide.

As used herein, the term "topic" shall mean a slide in a presentation program slide show.

Figure 1:
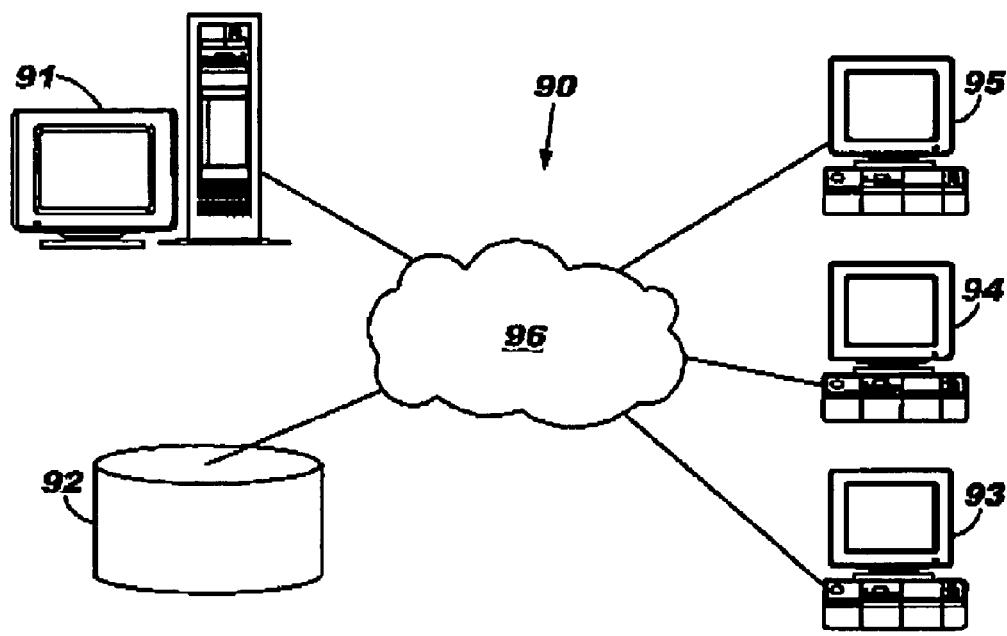
FIG. 1 is an illustration of a computer network used to implement the present invention.

FIG. 1 is an illustration of computer network 90 associated with the present invention. Computer network 90 comprises local computer 95 electrically coupled to network 96. Local computer 95 is electrically coupled to remote computer 94 and remote computer 93 via network 96. Local computer 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 1 is intended as a representation of a possible operating network containing the present invention and is not meant as an architectural limitation.

Figure 2:
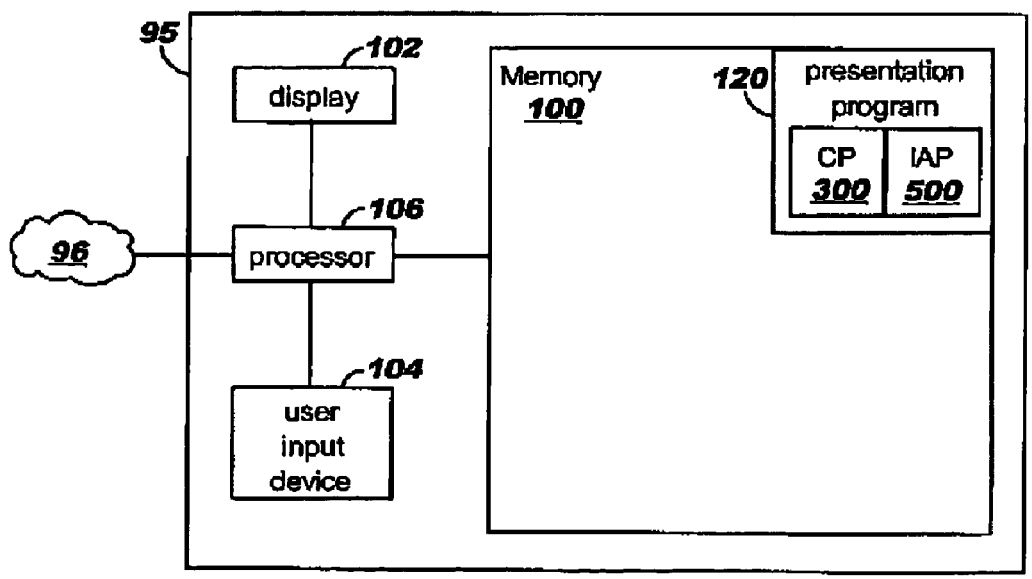
FIG. 2 is an illustration of a computer, including a memory and a processor, associated with the present invention.

The internal configuration of a computer, including connection and orientation of the processor, memory, and input/output devices, is well known in the art. The present invention is a methodology that can be embodied in a computer program. Referring to FIG. 2, the methodology of the present invention is implemented on software by Configuration Program (CP) 300 and Intelligent Agenda Program (IAP) 500. CP 300 and IAP 500 described herein can be stored within the memory of any computer depicted in FIG. 1. Alternatively, CP 300 and/or IAP 500 can be stored in an external storage device such as a removable disk, a Compact Disk Read-Only Memory (CD-ROM), or a Universal Serial Bus (USB) storage device. Memory 100 is illustrative of the memory within one of the computers of FIG. 1. Memory 100 also contains presentation program 120. Presentation program 120 is a computer program that is commonly used as a visual aid in presentations. Examples of presentation program 120 are MICROSOFT® POWERPOINT® and LOTUS® FREELANCE GRAPHICS®. The present invention may interface with presentation program 120 through memory 100. As part of the present invention, the memory 100 can be configured with presentation program 120, CP 300, and/or IAP 500. Processor 106 can execute the instructions contained in presentation program 120, CP 300, and/or IAP 500. Processor 106 is also able to display data on display 102 and accept user input on user input device 104. Processor 106, user input device 104, display 102, and memory 100 are part of a computer such as local computer 95 in FIG. 1. Processor 106 can communicate with other computers via network 96.

In alternative embodiments, presentation program 120, CP 300, and/or IAP 500 can be stored in the memory of other computers. Storing presentation program 120, CP 300, and/or IAP 500 in the memory of other computers allows the processor workload to be distributed across a plurality of processors instead of a single processor. Further configurations of presentation program 120, CP 300, and/or IAP 500 across various memories are known by persons of ordinary skill in the art. The present invention may be a method, a stand alone computer program, or a plug-in to an existing computer program. Persons of ordinary skill in the art are aware of how to configure computer programs, such as those described herein, to plug into an existing computer program.

Figure 3:
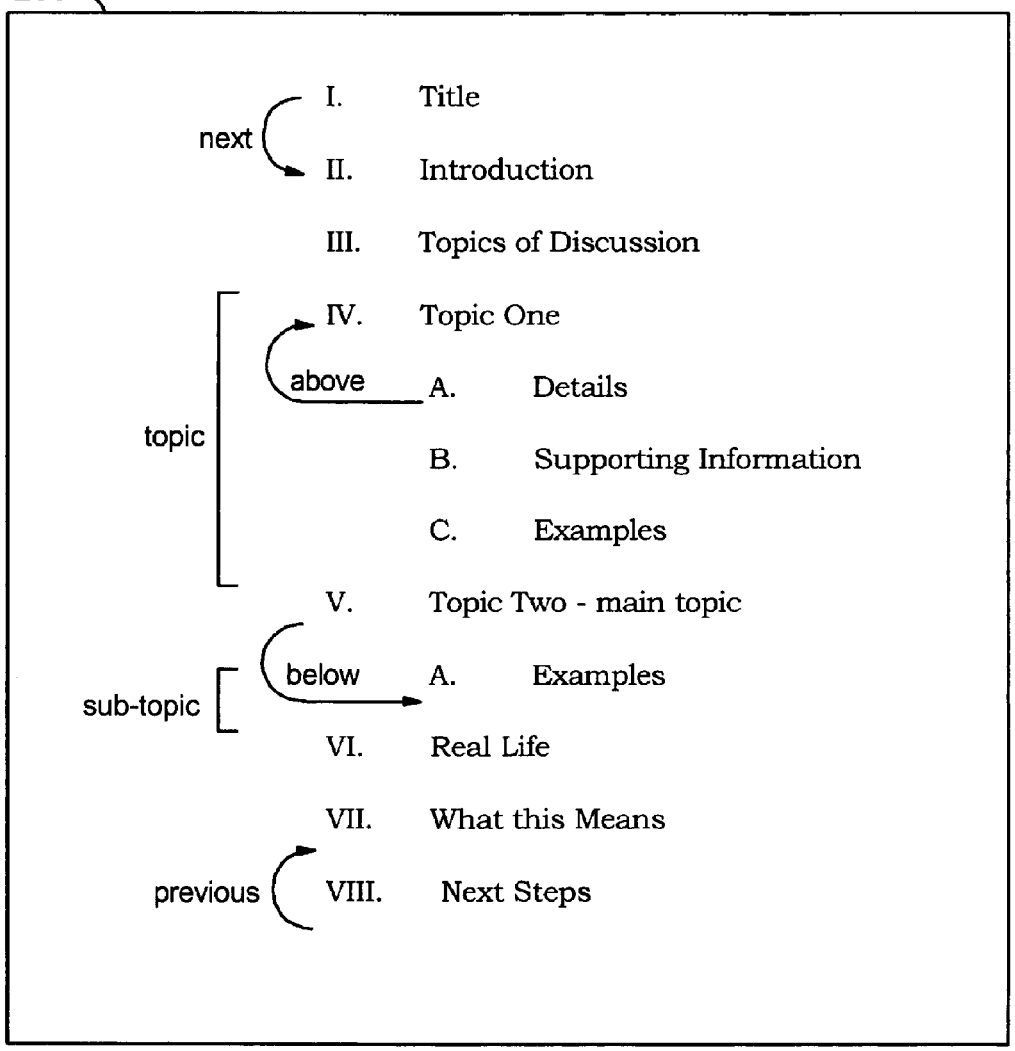
FIG. 3 is an illustration of the outline of topics for the present invention.

FIG. 3 illustrates the outline 200 of a slide show, which is used to illustrate the concepts of the present invention. Topics may be divided into two classifications: main topics and sub-topics. A main topic is a slide that introduces a new subject. A subtopic is a slide that elaborates on the subject matter in the main topic slide. A main topic is referred to as being above a subtopic. A subtopic is referred to as being below a main topic. Regardless of the classification of the topic, proceeding from a current topic to the subsequent topic is referred to as going to the next topic. Similarly, returning to an immediately prior topic from a current topic is referred to as going to the previous topic. In FIG. 3, outline 200 contains twelve slides arranged into eight main topics. Main topic IV has three sub-topics and main topic V has one sub-topic.

Figure 4:
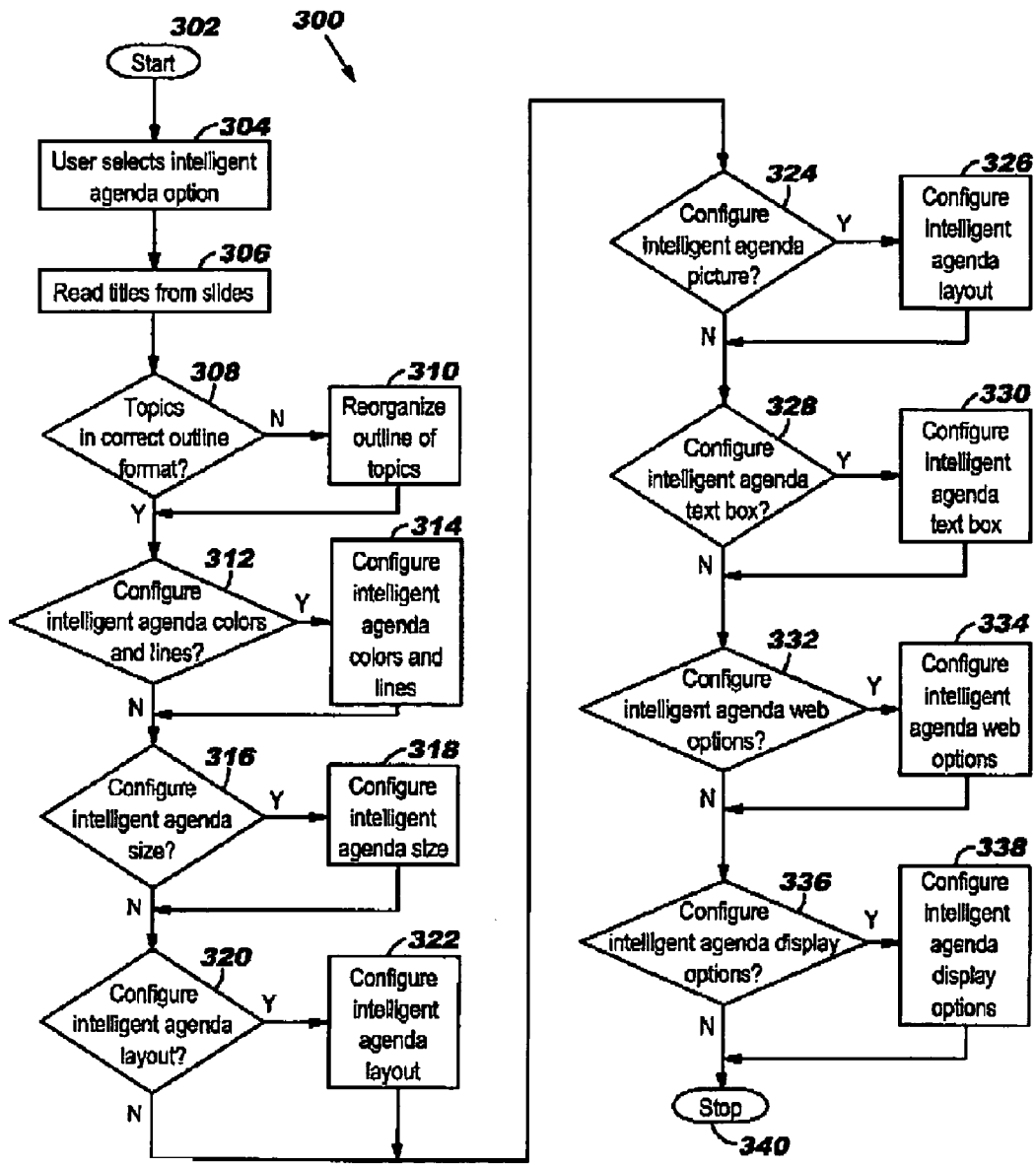
FIG. 4 is an illustration of the logic of the Configuration Program (CP) of the present invention.

FIG. 4 illustrates the logic of Configuration Program (CP) 300 of the present invention. CP 300 is a program that configures the intelligent agenda of the present invention. CP 300 starts when the user invokes the options menu for presentation program 120 (302). The user then selects the intelligent agenda option from the options menu (304). CP 300 then reads the titles from the slides in presentation program 120 (306). CP 300 queries the user to determine whether the topics are in the correct outline format (308). If the topics are in the correct outline format, CP 300 proceeds to step 312. If the topics are not in the correct outline format, then the user reorganizes the outline of topics (310). In reorganizing the outline of topics, the user may arrange the organization of topics and subtopics. The user may also change the name of the topics as desired. CP 300 then proceeds to step 312.

At step 312, CP 300 determines if the user wants to configure the intelligent agenda colors and lines (312). If the user does not want to configure the intelligent agenda colors and lines, CP 300 proceeds to step 316. If the user wants to configure the intelligent agenda colors and lines, CP 300 accepts the user's configuration of the intelligent agenda colors and lines (314). The user may configure the intelligent agenda colors and lines using GUI 400 illustrated in FIG. 5. CP 300 then proceeds to step 316.

At step 316, CP 300 determines if the user wants to configure the intelligent agenda size (316). If the user does not want to configure the intelligent agenda size, CP 300 proceeds to step 320. If the user wants to configure the intelligent agenda size, CP 300 accepts the user's configuration of the intelligent agenda size (318). The user may configure the intelligent agenda size using GUI 400 illustrated in FIG. 6. CP 300 then proceeds to step 320.

At step 320, CP 300 determines if the user wants to configure the intelligent agenda layout (320). If the user does not want to configure the intelligent agenda layout, CP 300 proceeds to step 324. If the user wants to configure the intelligent agenda layout, CP 300 accepts the user's configuration of the intelligent agenda layout (322). The user may configure the intelligent agenda layout using GUI 400 illustrated in FIG. 7. CP 300 then proceeds to step 324.

At step 324, CP 300 determines if the user wants to configure the intelligent agenda picture (324). If the user does not want to configure the intelligent agenda picture, CP 300 proceeds to step 328. If the user wants to configure the intelligent agenda picture, CP 300 accepts the user's configuration of the intelligent agenda picture (326). The user may configure the intelligent agenda picture using GUI 400 illustrated in FIG. 8. CP 300 then proceeds to step 328.

At step 328, CP 300 determines if the user wants to configure the intelligent agenda text box (328). If the user does not want to configure the intelligent agenda text box, CP 300 proceeds to step 332. If the user wants to configure the intelligent agenda text box, CP 300 accepts the user's configuration of the intelligent agenda text box (330). The user may configure the intelligent agenda text box using GUI 400 illustrated in FIG. 9. CP 300 then proceeds to step 332.

At step 332, CP 300 determines if the user wants to configure the intelligent agenda web options (332). If the user does not want to configure the intelligent agenda web options, CP 300 proceeds to step 336. If the user wants to configure the intelligent agenda web options, CP 300 accepts the user's configuration of the intelligent agenda web options (334). The user may configure the intelligent agenda web options using GUI 400 illustrated in FIG. 10. CP 300 then proceeds to step 336.

At step 336, CP 300 determines if the user wants to configure the intelligent agenda display options (336). If the user does not want to configure the intelligent agenda display options, CP 300 proceeds to step 340. If the user wants to configure the intelligent agenda display options, CP 300 accepts the user's configuration of the intelligent agenda display options (338). The user may configure the intelligent agenda display options using GUI 400 illustrated in FIG. 11. CP 300 then proceeds to step 340. At step 340, CP 300 ends (340).

Figure 5:
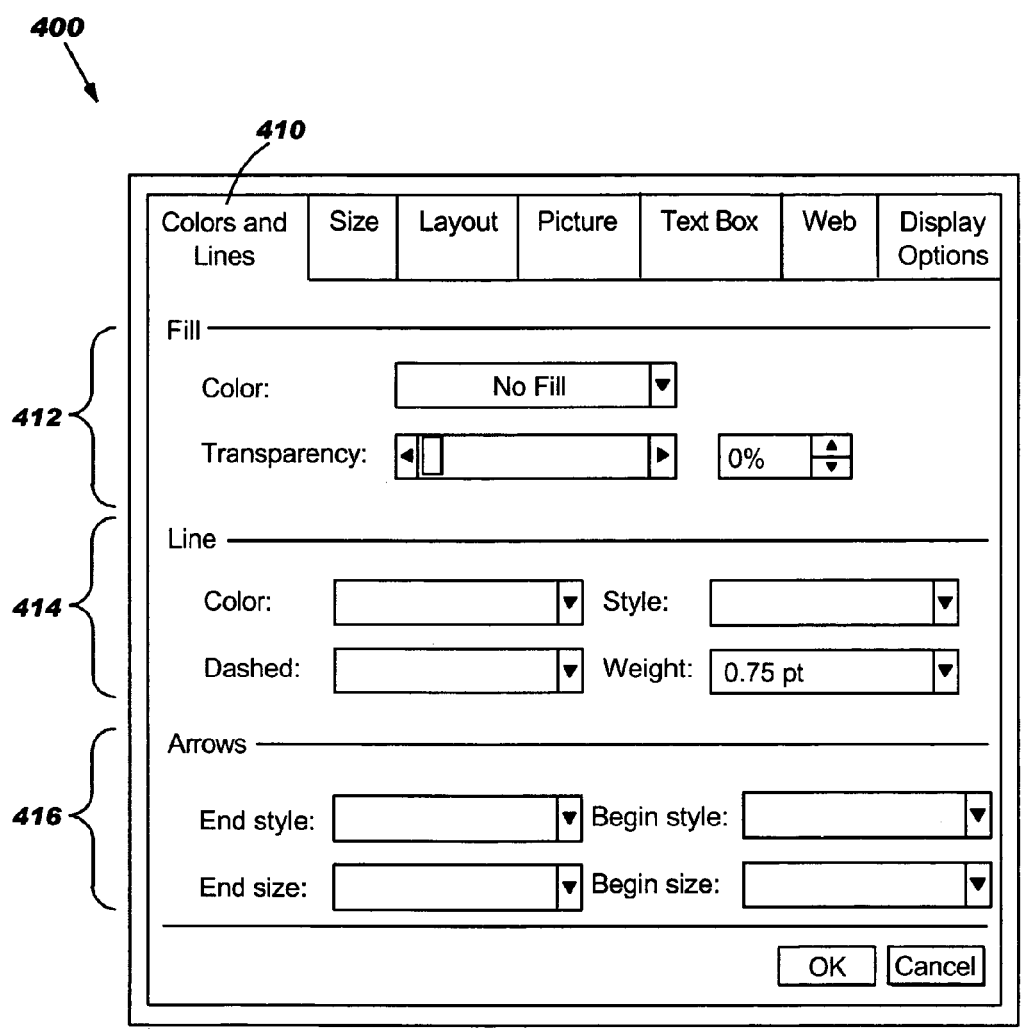
FIG. 5 is an illustration of the colors and lines tab of the present invention.

FIG. 5 is an illustration of a graphical user interface (GUI) 400 that allows a user to configure the intelligent agenda of the present invention. GUI 400 contains a plurality of configuration tabs, such as colors and lines tab 410. Colors and lines tab 410 contains fill options 412, line options 414, and arrow options 416. The user may configure the background color and the transparency of the intelligent agenda using fill options 412. The user may configure the color, style, and thickness of the lines used to separate the intelligent agenda from the remainder of the slide using line options 414. The user may configure the style and size of the pointer arrow that indicates the current topic or subtopic on the intelligent agenda using arrow options 416. The user may accept the configuration options by clicking the "OK" button or may cancel the configuration options by clicking the "Cancel" button. Persons of ordinary skill in the art will appreciate that other options can be configured on colors and lines tab 410.

Figure 6:
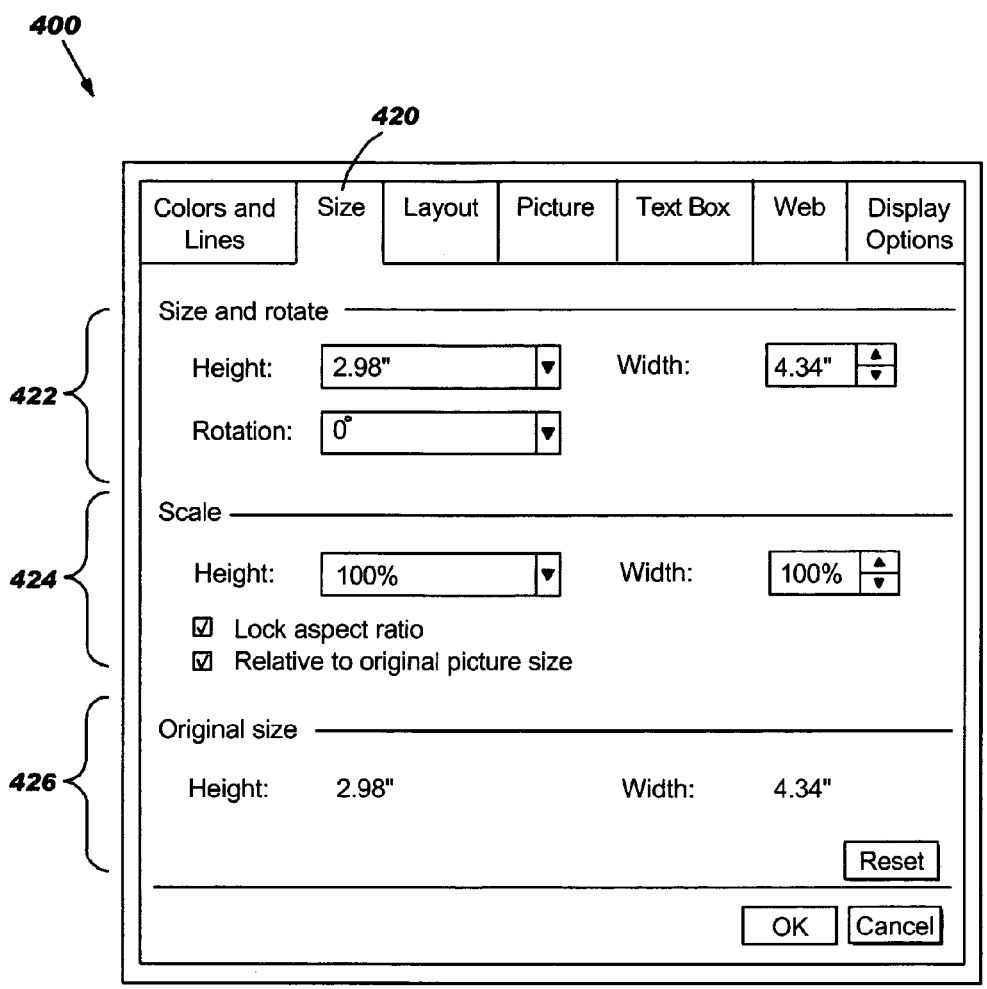
FIG. 6 is an illustration of the size tab of the present invention.

FIG. 6 is an illustration of GUI 400 displaying size tab 420. Size tab 420 allows a user to configure the size of the intelligent agenda of the present invention. Size tab 420 contains size and rotate options 422, scale options 424, and original size data 426. Size and rotate options 422 allow a user to configure the height and width of the intelligent agenda. Size and rotate options 422 also allow the user to rotate the intelligent agenda, if desired. Scale options 424 allow the user to modify the height and width of the intelligent agenda by changing the relative size of the intelligent agenda. Scale options 424 also allow a user to lock the aspect ratio (ratio of height to width) of the intelligent agenda. Scale options 424 also allow a user to change the height and width relative to the original picture size. Original size data 426 is the original size of the intelligent agenda and can be used by the user as a reference when modifying the size of the intelligent agenda. The "Reset" button allows the user to reset the size of the intelligent agenda to the size described in original size data 426. The user may accept the configuration options by clicking the "OK" button or may cancel the configuration options by clicking the "Cancel" button. Persons of ordinary skill in the art will appreciate that other options can be configured on size tab 420.

Figure 7:
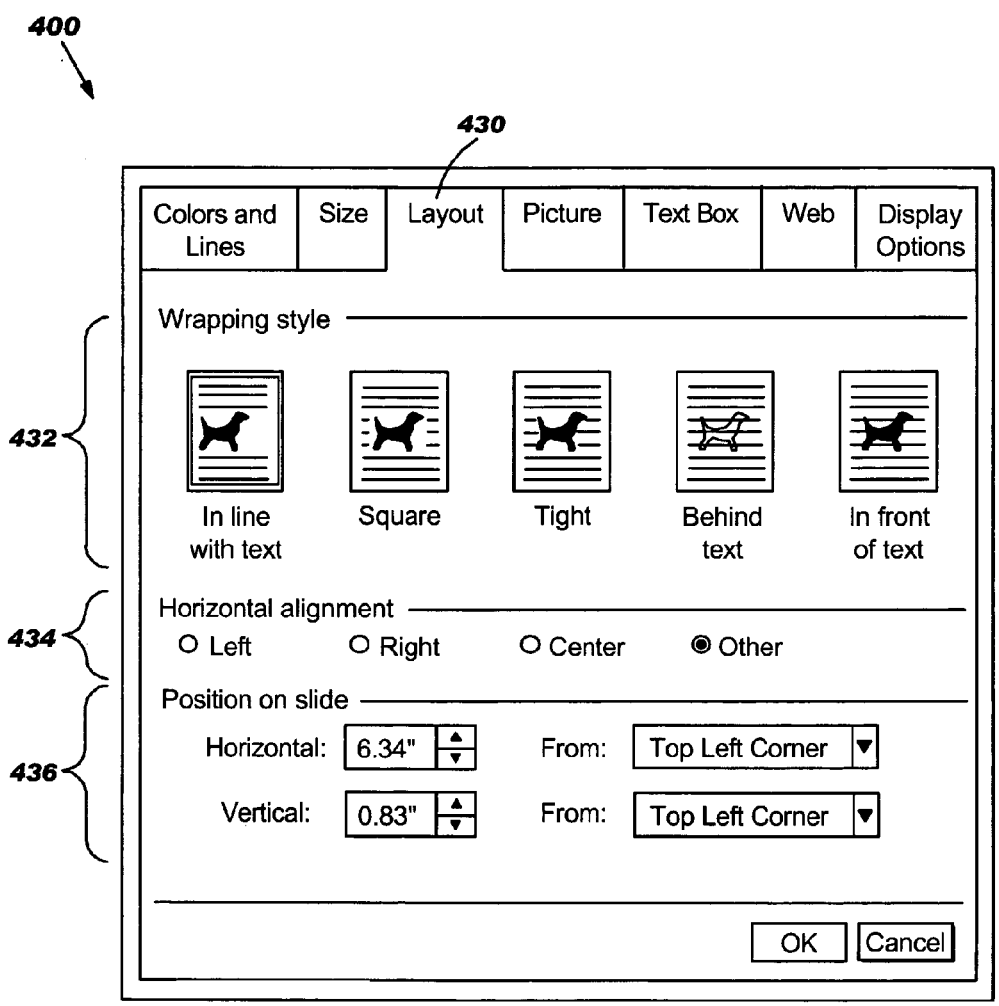
FIG. 7 is an illustration of the layout tab of the present invention.

FIG. 7 is an illustration of GUI 400 displaying layout tab 430. Layout tab 430 allows a user to configure the layout of the intelligent agenda of the present invention. Layout tab 430 contains wrapping style options 432, horizontal alignment options 434, and position on slide options 436. Wrapping style options 432 allow a user to configure how the intelligent agenda interacts with the text in the slides. Possible wrapping options are in-line with the text, square, tight, behind text, and in front of text. Horizontal alignment options 434 allow the user to specify the horizontal alignment of the intelligent agenda. Possible horizontal alignments are left, center, right, and other. Persons skilled in the art will appreciate that layout tab 430 may be configured with similar options for the vertical alignment of the intelligent agenda. If the user selects "other" for the horizontal alignment option 434, then the user must specify the horizontal alignment using position on slide options 436. The user can also specify the vertical position of the intelligent agenda using position on slide options 436. The user may accept the configuration options by clicking the "OK" button or may cancel the configuration options by clicking the "Cancel" button. Persons of ordinary skill in the art will appreciate that other options can be configured on layout tab 430.

Figure 8:
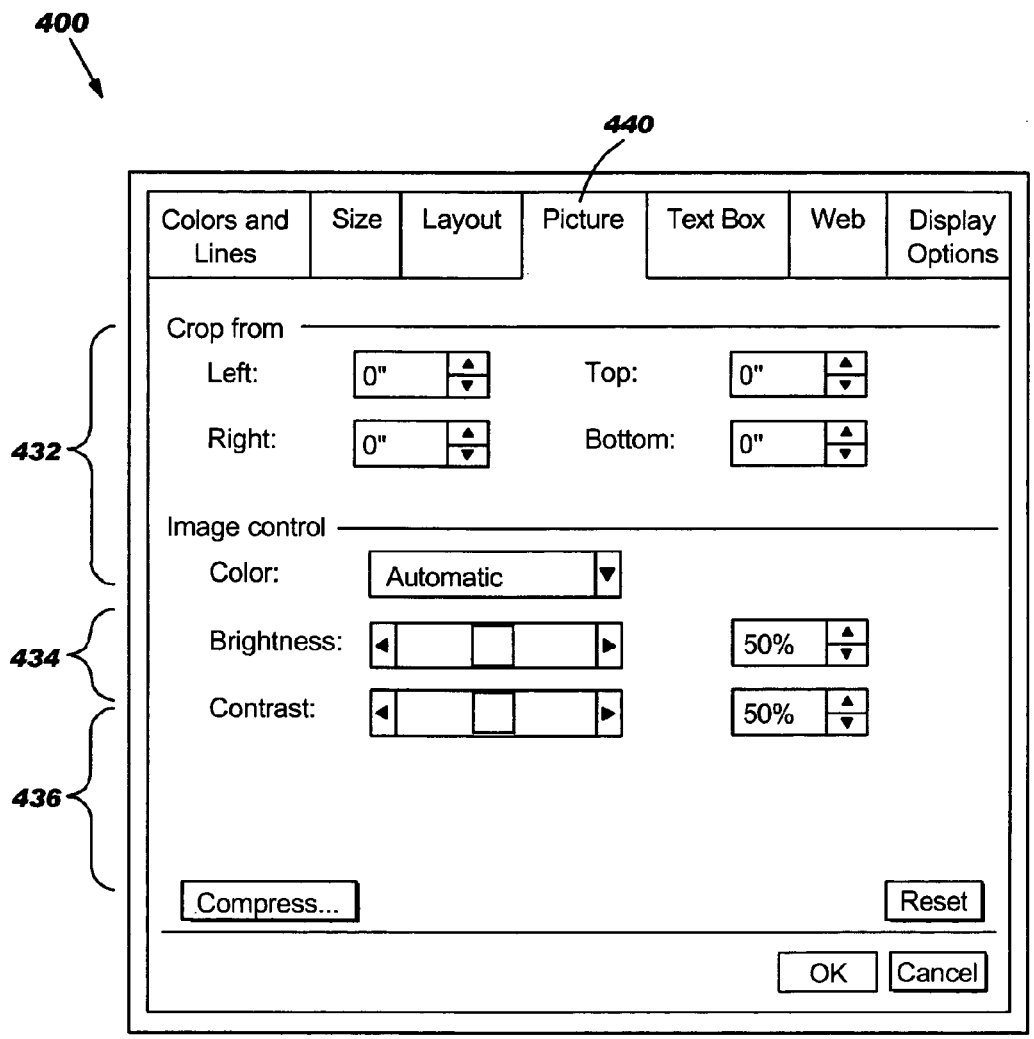
FIG. 8 is an illustration of the picture tab of the present invention.

FIG. 8 is an illustration of GUI 400 displaying picture tab 440. The intelligent agenda of the present invention may be configured with a picture from an image file such as a .jpg, .gif, or .bmp file. The image file may be stored on the Internet and accessed by the intelligent agenda of the present invention. Picture tab 440 allows a user to configure the picture of the intelligent agenda of the present invention. Picture tab 440 contains crop from options 442 and image control options 444. Crop from options 442 allow the user to crop a portion of a picture from a larger picture. Image control options 444 allow the user to control the color, brightness, and contrast of the picture used in the background of the intelligent agenda. The "Compress" button allows the user to compress or stretch the image as desired. The "Reset" button allows the user to reset the color, brightness, and contrast settings after the user has modified the color, brightness, and contrast settings. The user may accept the configuration options by clicking the "OK" button or may cancel the configuration options by clicking the "Cancel" button. Persons of ordinary skill in the art will appreciate that other options can be configured on picture tab 440.

Figure 9:
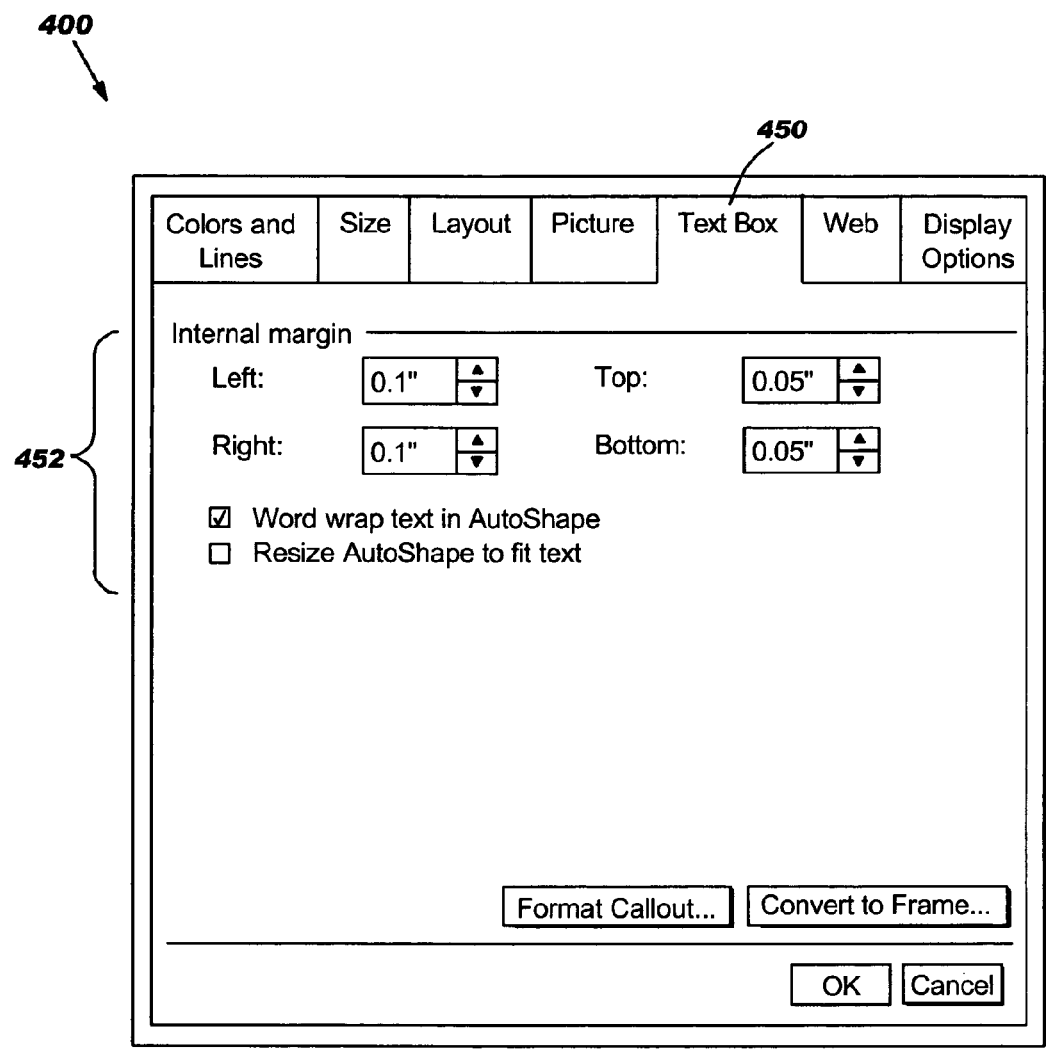
FIG. 9 is an illustration of the text box tab of the present invention.

FIG. 9 is an illustration of GUI 400 displaying text box tab 450. Text box tab 450 allows a user to configure the text display area within the intelligent agenda of the present invention. Text box tab 450 contains internal margin options 452. Internal margin options 452 allows the user to set the top, bottom, left, and right margins inside the intelligent agenda. The user may also select a checkbox to word wrap the text of the intelligent agenda. Additionally, the user may select a checkbox to resize the dimensions of the intelligent agenda to fit the text within the intelligent agenda. The user may select the "Format Callout" button to format the text of the intelligent agenda. The user may select the "Convert to Frame" button to convert the text box of the intelligent agenda into a frame. The user may accept the configuration options by clicking the "OK" button or may cancel the configuration options by clicking the "Cancel" button. Persons of ordinary skill in the art will appreciate that other options can be configured on text box tab 450.

Figure 10:
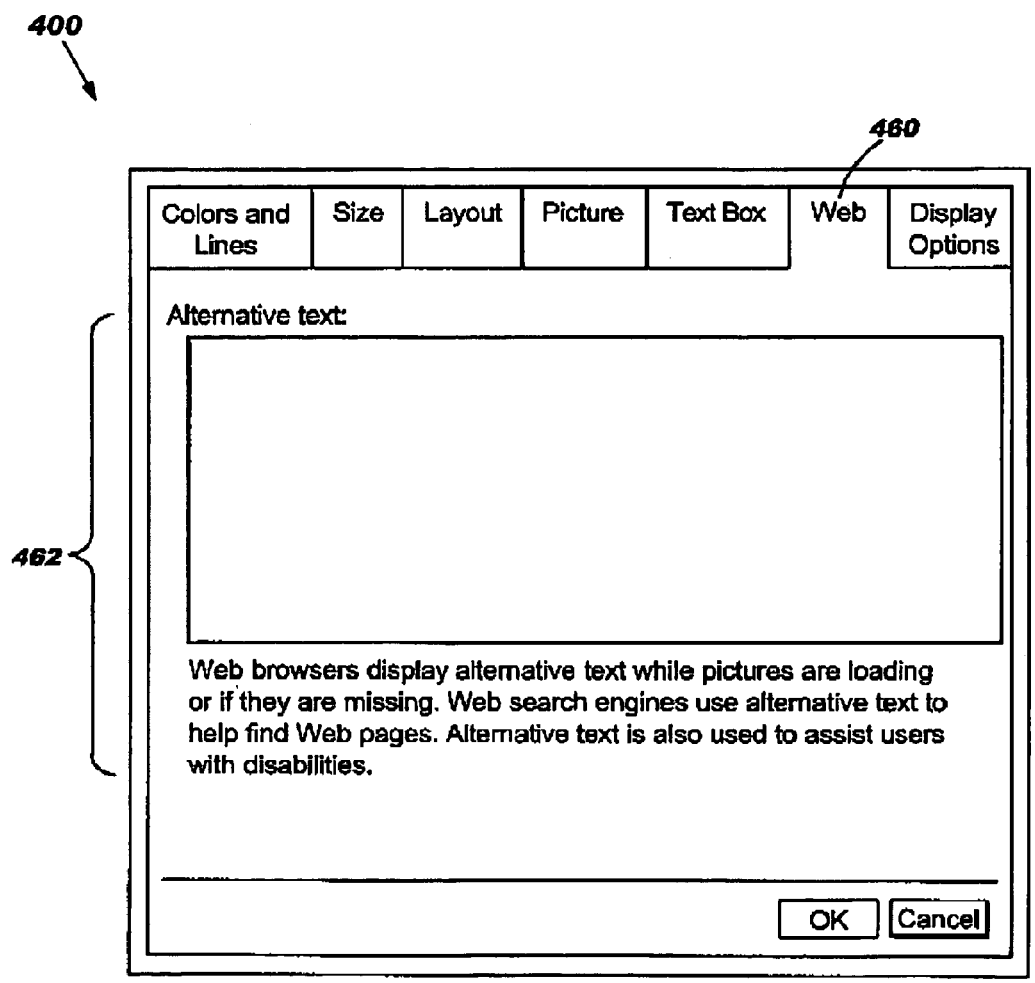
FIG. 10 is an illustration of the web tab of the present invention.

FIG. 10 is an illustration of GUI 400 displaying web tab 460. As part of the present invention, the intelligent agenda can be configured with a picture stored on the Internet. Web tab 460 allows a user to configure an alternative message to display when the Internet image is loading or unavailable. Web tab 460 contains alternative text options 462. Alternative text options allow the user to enter text to display when the image from the Internet cannot be displayed. The user may accept the configuration options by clicking the "OK" button or may cancel the configuration options by clicking the "Cancel" button. Persons of ordinary skill in the art will appreciate that other options can be configured on web tab 460.

Figure 11:
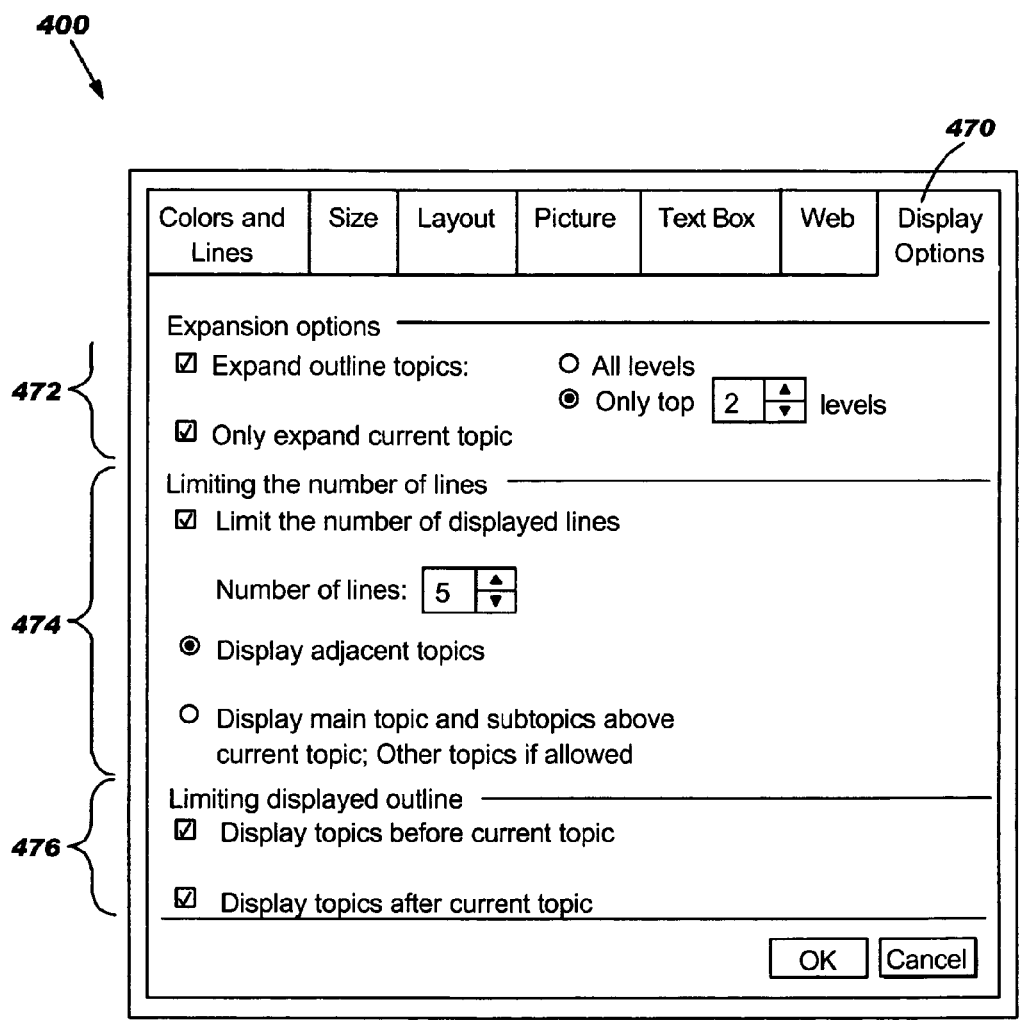
FIG. 11 is an illustration of the display options tab of the present invention.

FIG. 11 is an illustration of GUI 400 displaying display options tab 470. Display options tab 470 allows a user to configure the display and expansion of the outline of the intelligent agenda of the present invention. Display options tab 470 contains expansion options 472, limiting the number of lines options 474, and limiting the displayed outline options 476. Expansion options 472 allow the user to select a checkbox that will expand the outline beyond the main topics. The user may choose to expand the entire outline or may choose only to expand a certain number of levels of the outline. The user may also select a checkbox that will instruct the presentation program to only expand the current topic.

Limiting the number of lines options 474 allows the user to limit the number of lines displayed on the intelligent agenda. By selecting the checkbox for limiting the number of lines options 474, the user can configure the total number of lines displayed on the intelligent agenda. When the number of lines in the outline exceeds the number of display lines configured in limiting the number of lines options 474, the user must select a method for determining the lines that will be displayed. The user may choose a radio button that displays the adjacent topics regardless of the topic classification (i.e. main topic or subtopic). This option is useful when the audience needs to see what is immediately before and after the current topic. Alternatively, the user can select a radio button that displays the main topic and sub-topics above the current topic, and then displays other adjacent topics as permitted. For example, if the user is currently on the seventh slide on FIG. 3 (i.e. IV. C. Examples), has limited the number of displayed lines to five, and has selected the second display option, then the invention will display the topics from the fourth through eighth slides on the intelligent agenda. The present invention displays the seventh slide's topic on the outline because that is the current slide. The present invention also displays the fourth slide's topic on the outline because the fourth slide is above the current slide. Because there are no more topics above the fourth slide, the invention displays the topics for the slides that are adjacent to the current slide: the fifth, sixth, and eighth slides. The second option is useful when the audience needs to know the contextual placement of the current slide.

Limiting the displayed outline options 476 allows the user to configure the display of the outline of the intelligent agenda such that only the desired outline topics are displayed. The user may select a checkbox to display the topics before the current topic. This is a useful option when the audience needs to see what outline topics have already been covered in the presentation. The user may also select a checkbox to display the topics after the current topic. This is a useful option when the audience needs to see what outline topics will be covered next in the presentation. Selecting neither checkbox allows the intelligent agenda to only display the current topic. Selecting both checkboxes allows the intelligent agenda to display the topics before and after the current topic, subject to the limitations in limiting the number of lines options 474. The user may accept the configuration options by clicking the "OK" button or may cancel the configuration options by clicking the "Cancel" button. Persons of ordinary skill in the art will appreciate that other options can be configured on display options tab 470.

Figure 12:
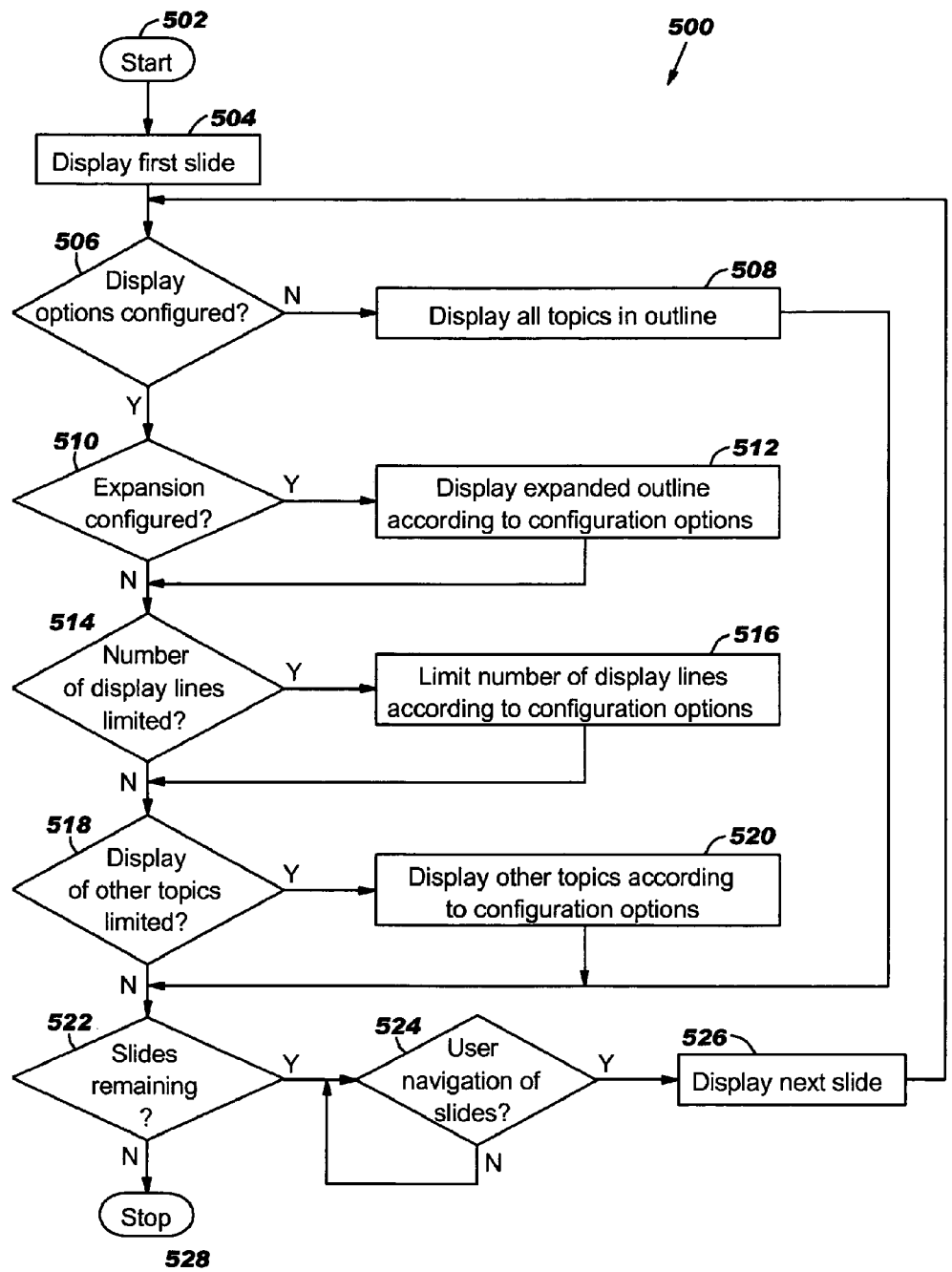
FIG. 12 is an illustration of the logic of the Intelligent Agenda Program (IAP) of the present invention.

FIG. 12 illustrates the logic of the Intelligent Agenda Program (IAP) 500 of the present invention. IAP 500 is a computer program that displays the intelligent agenda on the slides of presentation program 120. IAP 500 displays the intelligent agenda according to the configuration selected by the user in CP 300. IAP 500 starts when the user runs presentation program 120 (502). IAP 500 then displays the first slide of the slide show (504). IAP 500 then determines whether the user has configured the display options (506). The user can configure the display options using display options tab 470. If the user has not configured the display options, then IAP 500 displays all of the topics in the outline (508) and proceeds to step 522. If the user has configured the display options, then IAP 500 determines whether the user has configured the expansion options (510). If the user has not configured the expansion options, then IAP 500 proceeds to step 514. If the user has configured the expansion options, then IAP 500 displays the expanded outline according the configuration options selected by the user (512). IAP 500 then proceeds to step 514.

At step 514, IAP 500 determines whether the user has limited the number of displayed lines (514). If the user has not limited the number of displayed lines, then IAP 500 proceeds to step 518. If the user has limited the number of displayed lines, then IAP 500 modifies and/or displays the outline according to the configuration options selected by the user (516). At step 516, LAP 500 will display the outline if the outline was not displayed in step 512. At step 516, LAP 500 will modify the outline if the outline was displayed in step 512. IAP 500 then proceeds to step 518.

At step 518, IAP 500 determines whether the user has limited the display of prior and subsequent topics (518). If the user has not limited the display of prior and subsequent topics, then IAP 500 proceeds to step 522. If the user has limited the display of prior and subsequent topics, then IAP 500 modifies and/or displays the outline according the configuration options selected by the user (520). At step 520, IAP 500 will display the outline if the outline was not displayed in step 512 or step 516. At step 520, IAP 500 will modify the outline if the outline was displayed in step 512 or step 516. IAP 500 then proceeds to step 522.

At step 522, IAP 500 determines if there are slides remaining in the slide show (522). If there are not any slides remaining, IAP 500 ends (528). If there are slides remaining, then IAP 500 waits for the user to navigate the slides (524). The user may navigate the slides by choosing the next slide, the previous slide, or any slide in the slide show. When the user navigates the slides, IAP 500 displays the slide chosen by the user (i.e. the next, previous, or selected slide) and returns to step 506.

Figure 13A:
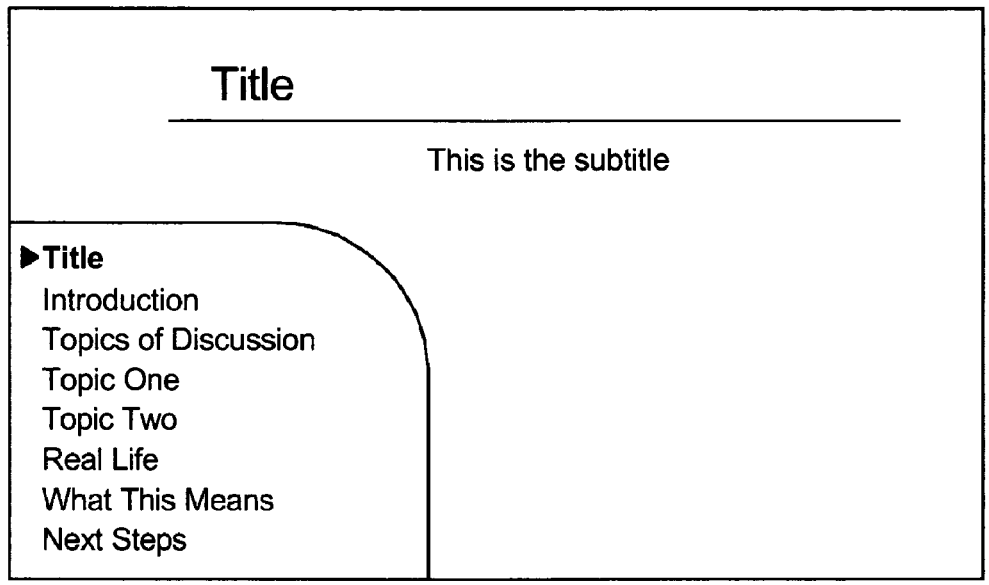
FIGS. 13A, 13B, 13C, and 13D illustrate the progression of the pointer down the intelligent agenda of the present invention.
Figure 13B:
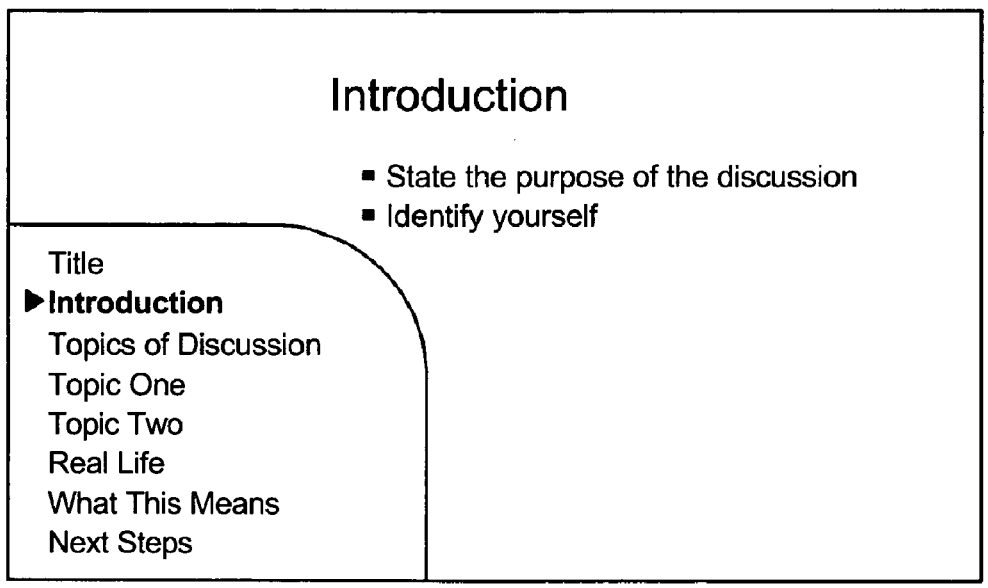
Figure 13C:
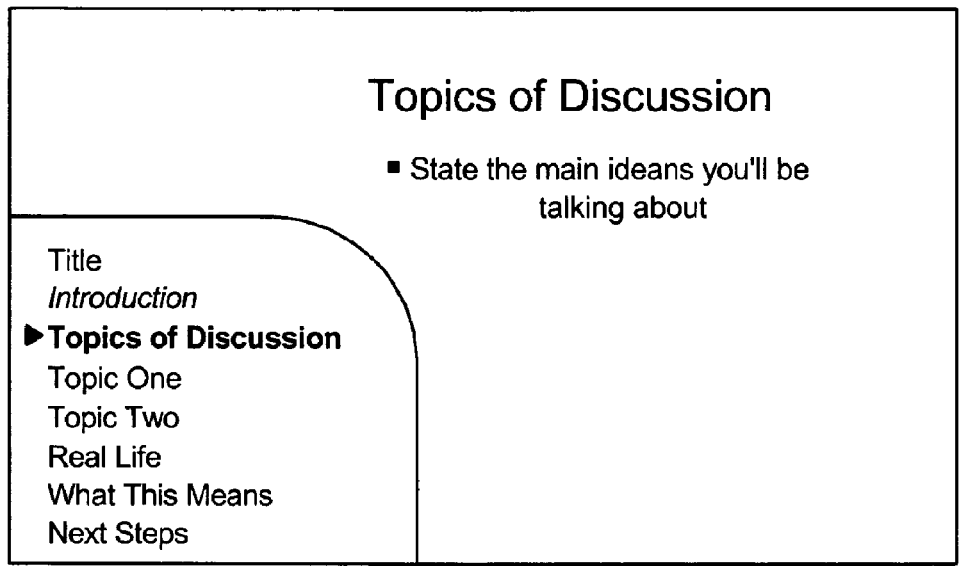
Figure 13D:
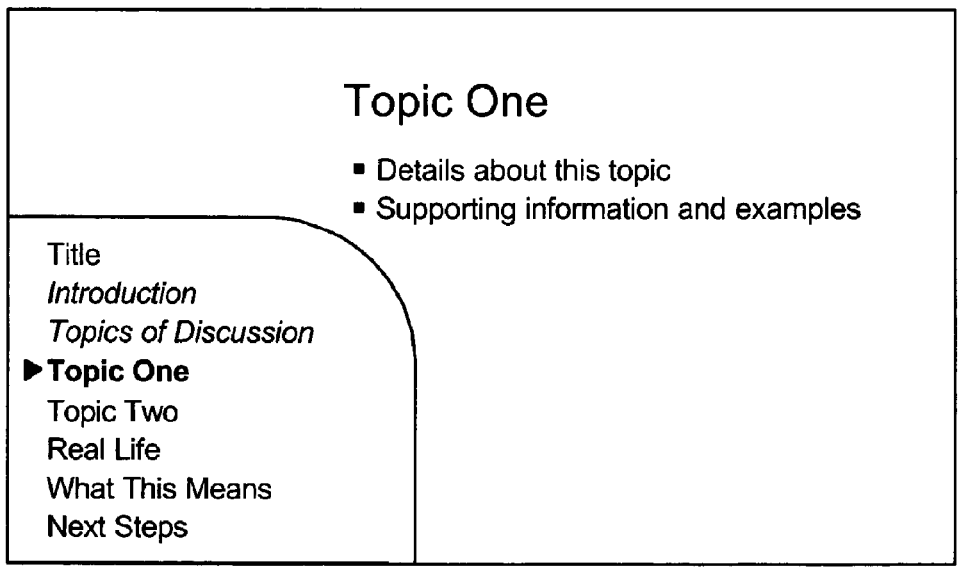

FIGS. 13A, 13B, 13C, and 13D illustrate the progression of the pointer down the outline of the intelligent agenda of the present invention. The intelligent agenda is the outline presented in the lower left corner of the slides. As the user navigates from one slide to another, the pointer indicates the current topic that the user is discussing. Additionally, the current topic is presented in bold on the intelligent agenda. FIGS. 13A though 13D are used for comparison to FIGS. 14 though 20.

Figure 14:
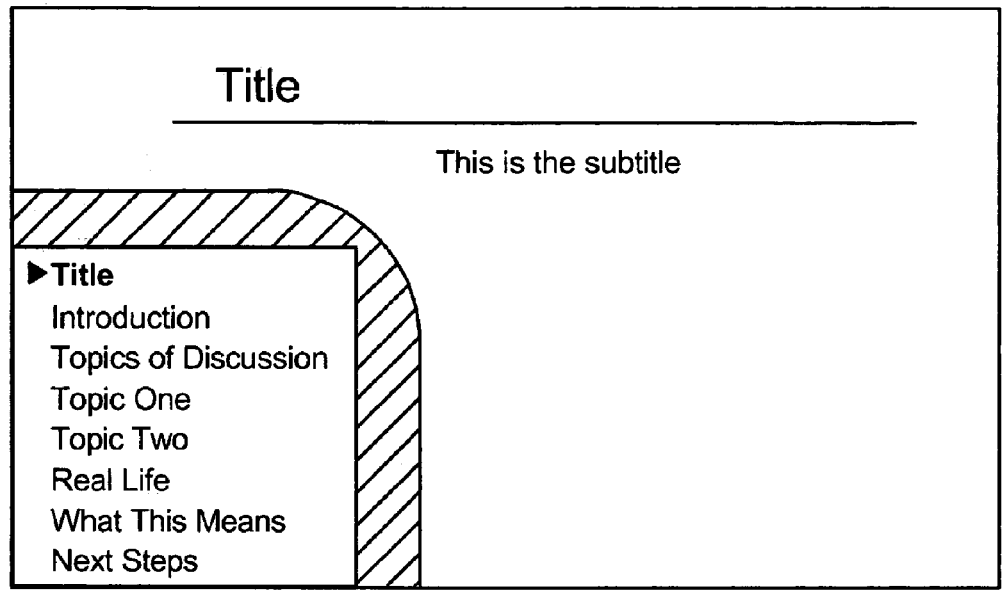
FIG. 14 illustrates the intelligent agenda modified using the colors and lines tab of the CP.

FIG. 14 illustrates the intelligent agenda modified using the colors and lines tab 410. The background color of the outline has been removed in FIG. 14.

Figure 15:
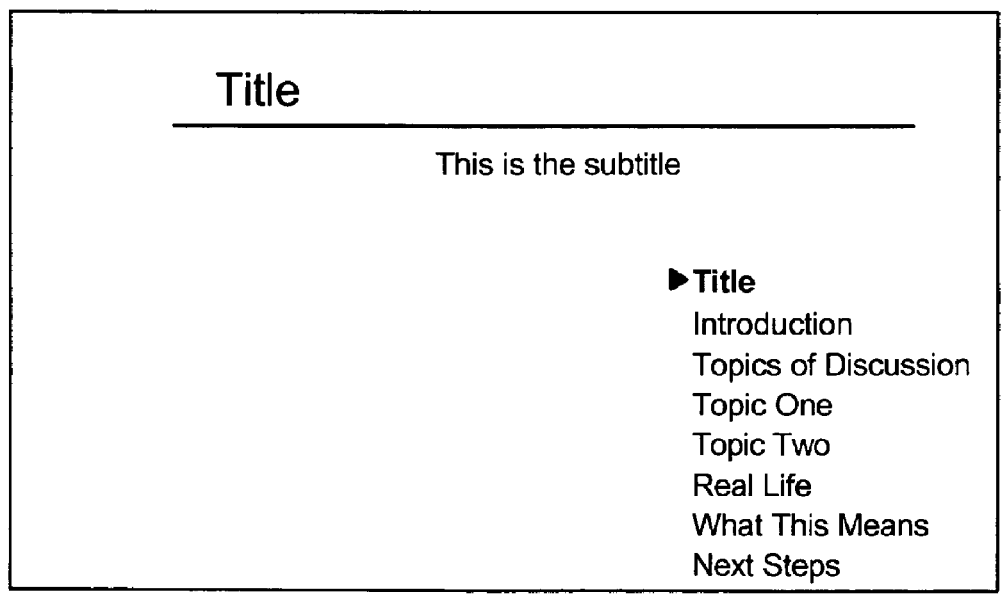
FIG. 15 illustrates the intelligent agenda modified using layout tab of the CP.

FIG. 15 illustrates the intelligent agenda modified using layout tab 430. The intelligent agenda has been moved from the lower left corner to the lower right corner.

Figure 16:
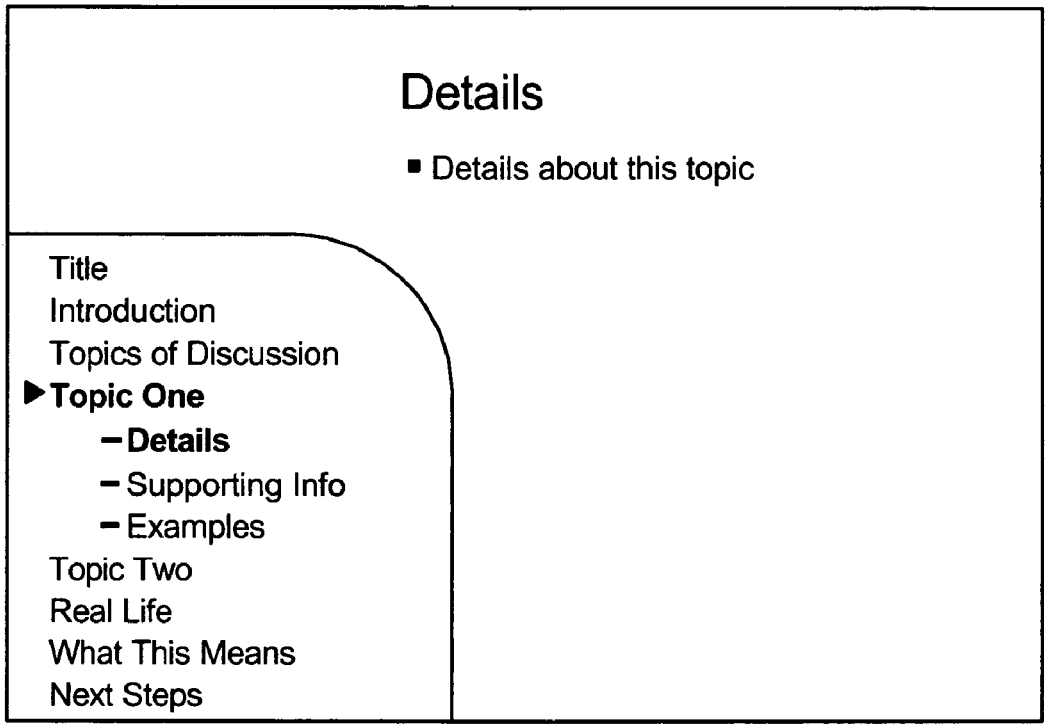
FIGS. 16, 17, 18, 19, and 20 illustrate the intelligent agenda modified using display options tab of the CP.

FIG. 16 illustrates the intelligent agenda modified using expansion options 472 in display options tab 470. Specifically, in FIG. 16 the intelligent agenda expands the outline for the current sub-topic. In FIG. 16, the intelligent agenda is also configured such the main topic is bold and indicated by the pointer, but the current sub-topic is only bold. When the user navigates to the next slide, the "Details" item will no longer be bold and the "Supporting Info" outline item will become bold.

Figure 17:
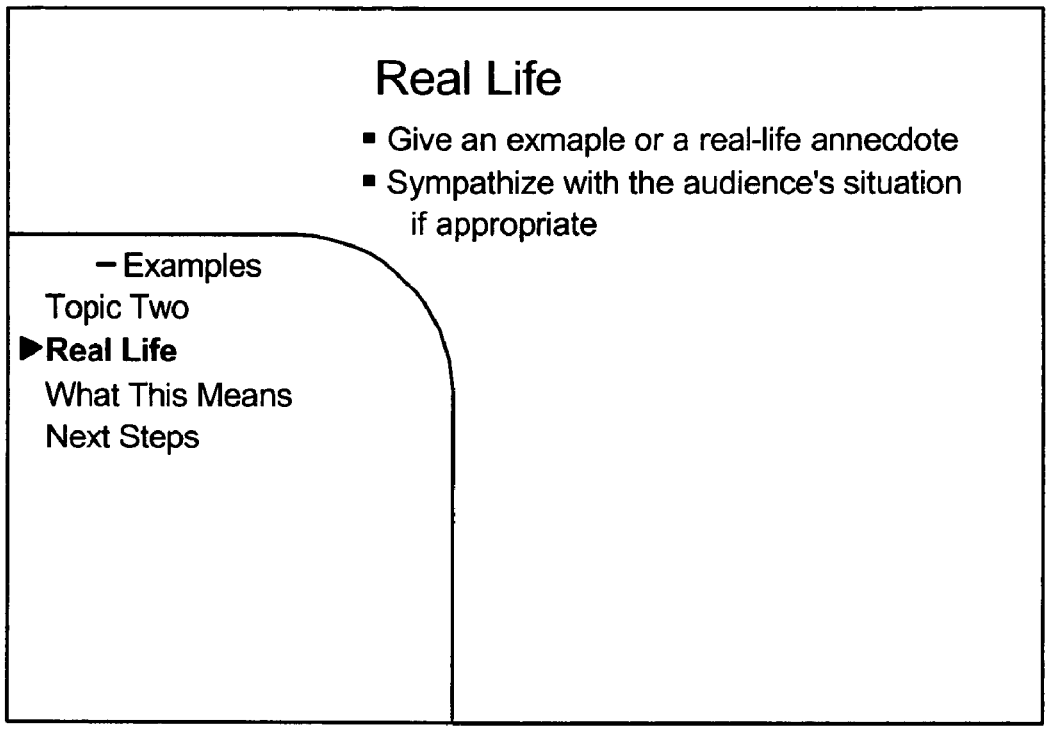
Figure 18:
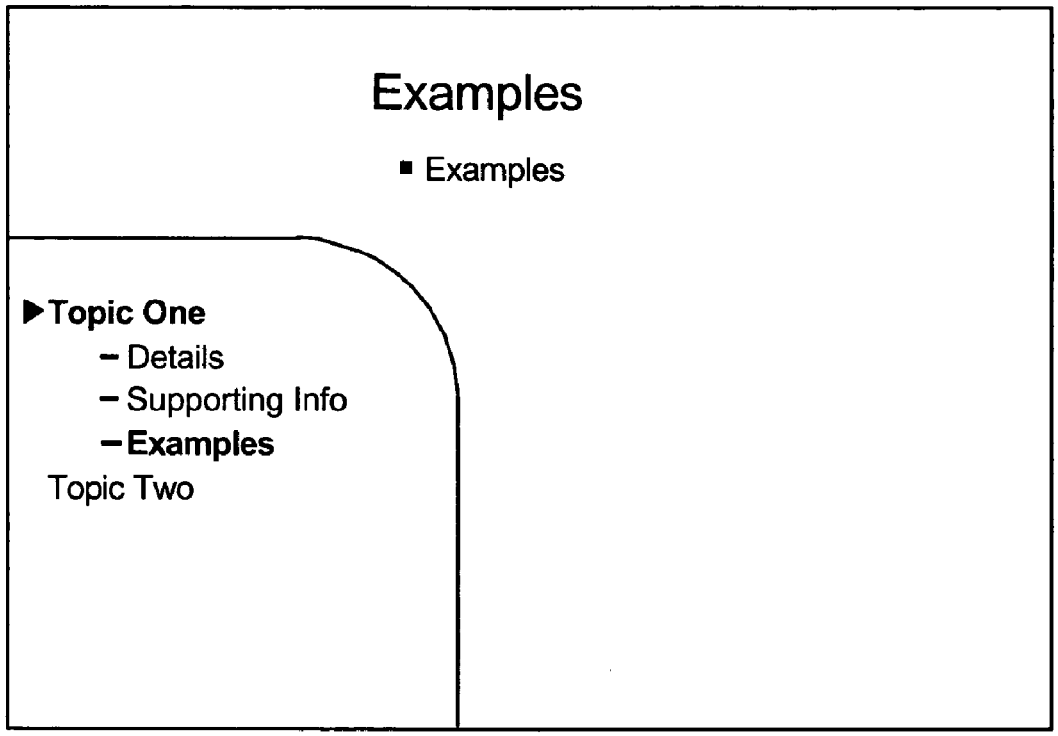

FIGS. 17 and 18 illustrate the intelligent agenda modified using limiting the number of lines options 474 in display options tab 470. Specifically, in FIGS. 17 and 18 the number of lines has been limited to five. FIG. 17 illustrates the first of the two display methodologies in limiting the number of lines options 474. FIG. 18 illustrates the second of the two display methodologies in limiting the number of lines options 474.

Figure 19:
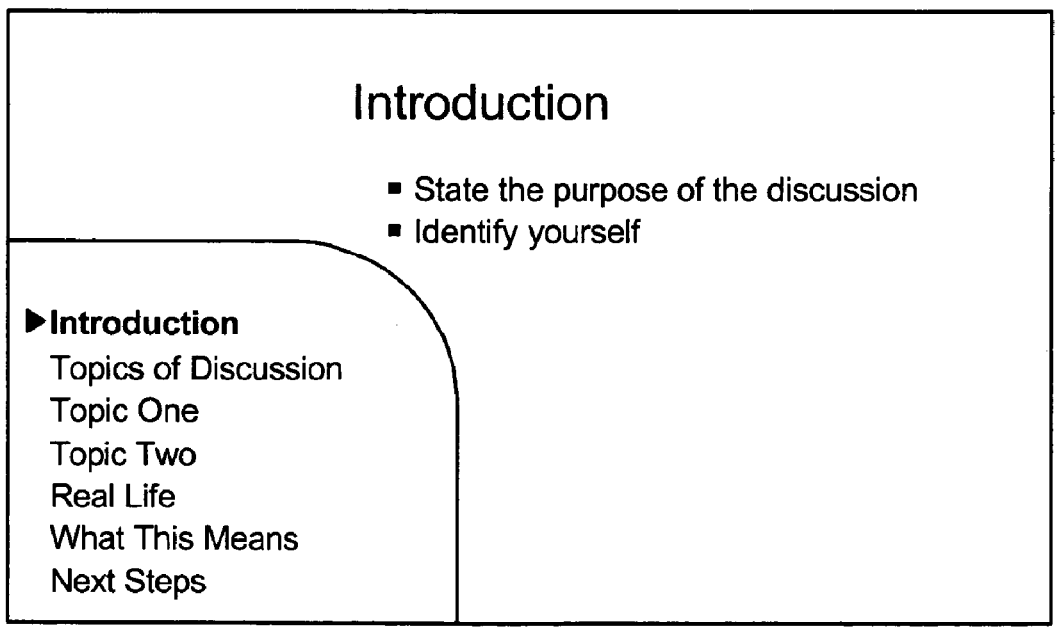
Figure 20:
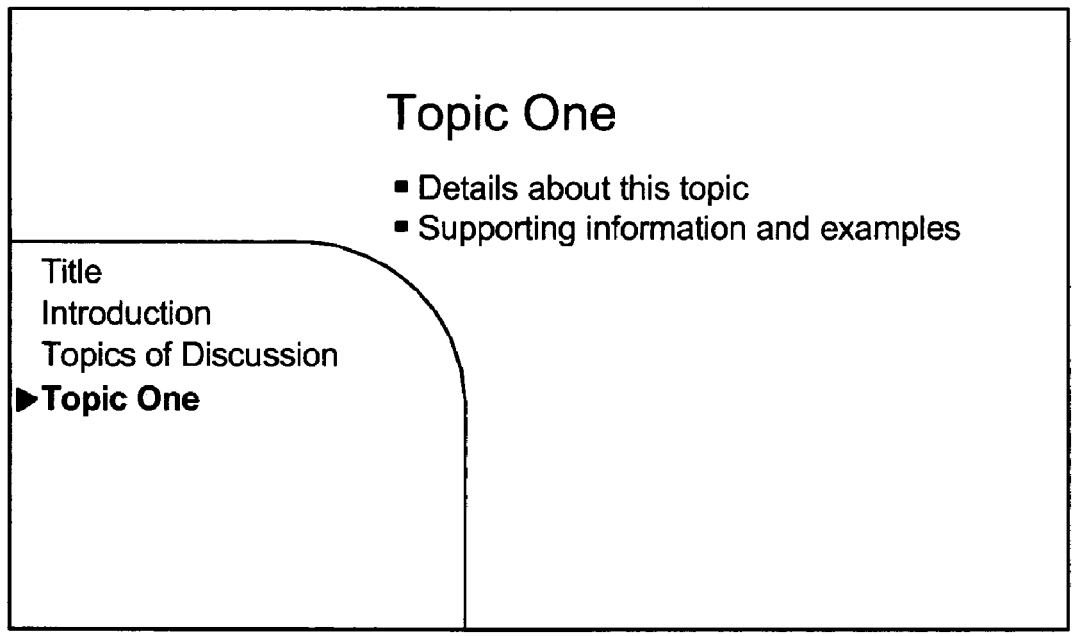

FIGS. 19 and 20 illustrate the intelligent agenda modified using limiting the displayed outline options 476 in display options tab 470. Specifically, in FIG. 19 the user has selected to display the topics after the current topic, but not the topics before the current topic. In FIG. 20, the user has selected to display the topics before the current topic, but not the topics after the current topic.

In an alternative embodiment of the present invention, the intelligent agenda can be configured with a timer that indicates the approximate length of each outline item and/or the approximate length of the presentation. This embodiment is useful when the audience needs to know the time remaining in a particular topic or for the entire presentation.

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A system, comprising:
   a memory;
   a display; and
   a processor programmed to:
   load a configuration program and an intelligent agenda program into the memory, wherein the intelligent agenda program is adapted to interface with a slide presentation program and to respond to a plurality of user inputs to a graphical user interface of the configuration program;
   responsive to a user invoking an options menu on the slide presentation program and selecting an intelligent agenda option on the options menu, create an intelligent agenda for a plurality of slides by accessing a plurality of titles from the plurality of slides in the slide presentation program to create an outline, adapt the outline to be displayed in a corner on each slide of the plurality of slides, and further adapt the outline to track a user's progression through a presentation of the plurality of slides by a pointer that automatically moves to a title in the outline corresponding to a currently displayed slide;
   further responsive to the user selecting the intelligent agenda option on the options menu, display the graphical user interface on the display;
   responsive to a first set of the plurality of user inputs to the graphical user interface, introduce a user configurable line to each slide of the plurality of slides, the user configurable line connecting to each of two contiguous border lines of each slide of the plurality of slides to define a corner section containing the outline on each slide of the plurality of slides; and
   responsive to a second set of the plurality of user inputs to the graphical user interface, limit a number of displayed lines of the outline to a line limitation and allow the user to select either a first display option or a second display option, wherein, when the user selects the first display option, the intelligent agenda is modified to display only the title in the outline corresponding to the currently displayed slide, a preceding title located immediately before the title, and a following title located immediately after the title, and when the user selects the second display option, the intelligent agenda is modified to display a portion of the plurality of titles that precede the title subject to the line limitation, and then only when the line limitation has not been met, display a portion of the plurality of titles that follow the title on the display until the line limitation is met.

2. The system of claim 1, where the processor is further programmed to:
   allow the user to select a third display option, wherein, when the user selects the third display option, limit a portion of the plurality of titles to be displayed in the outline to either the portion of the plurality of titles that precede the title, or to the portion of the plurality of titles that follow the title, and subject to the line limitation.

3. The system of claim 1, where the intelligent agenda program is further adapted to modify the outline to display a duration associated with each slide of the plurality of slides represented within the outline via the graphical user interface on the display as a portion of the outline.

4. The system of claim 1, where the intelligent agenda program is further adapted to modify at least one of a color of the outline, a size of the outline, a layout of the outline, and a picture associated with the outline.

5. The system of claim 1, where the intelligent agenda program is further adapted to accept a user configured format of the outline and to display the outline on the plurality of slides in the user configured format.

6. The system of claim 5, where the intelligent agenda program is further adapted to:
   determine whether the user has configured a display option; and
   responsive to the determination that the user has not configured the display option, display the outline with all titles in the outline expanded.

7. The system of claim 5, where the intelligent agenda program is further adapted to:
   determine whether the user has configured a display option; and
   responsive to the determination that the user has configured the display option, determine whether the user has selected an outline expansion option; and
   responsive to the determination that the user has selected the outline expansion option, display the outline according to the outline expansion option selected by the user.

8. The system of claim 5, where the intelligent agenda program is further adapted to:
   determine whether the user has configured a display option; and
   responsive to the determination that the user has configured the display option, determine whether the user has limited the number of displayed lines on the outline; and
   responsive to the determination that the user has limited the number of lines on the outline, modify the outline to the number of displayed lines limited by the user.

9. The system of claim 5, where the intelligent agenda program is further adapted to:
   determine whether the user has configured a display option; and
   responsive to the determination that the user has configured the display option, determine whether the user has limited a type of displayed topics on the outline; and
   responsive to the determination that the user has limited the type of displayed topics on the outline, modify the outline to the type of displayed topics limited by the user.

10. The system of claim 5, where the user configured format comprises a format selected from a group consisting of:
    a color and a line associated with the outline;
    a size of the outline;
    a layout of the outline;
    a picture associated with the outline;
    a text box associated with the outline; and
    a web message associated with the outline.

11. A computer program product comprising a computer readable storage medium including a computer readable program code, wherein the computer readable program code when executed on a computer causes the computer to:
    load a configuration program and an intelligent agenda program into a memory, wherein the intelligent agenda program is adapted to interface with a slide presentation program and to respond to a plurality of user inputs to a graphical user interface of the configuration program;
    responsive to a user invoking an options menu on the slide presentation program and selecting an intelligent agenda option on the options menu, create an intelligent agenda for a plurality of slides by accessing a plurality of titles from the plurality of slides in the slide presentation program to create an outline, adapt the outline to be displayed in a corner on each slide of the plurality of slides, and further adapt the outline to track a user's progression through a presentation of the plurality of slides by a pointer that automatically moves to a title in the outline corresponding to a currently displayed slide;
    further responsive to the user selecting the intelligent agenda option on the options menu, display the graphical user interface on a display;
    responsive to a first set of the plurality of user inputs to the graphical user interface, introduce a user configurable line to each slide of the plurality of slides, the user configurable line connecting to each of two contiguous border lines of each slide of the plurality of slides to define a corner section containing the outline on each slide of the plurality of slides; and
    responsive to a second set of the plurality of user inputs to the graphical user interface, limit a number of displayed lines of the outline to a line limitation and allow the user to select either a first display option or a second display option, wherein, when the user selects the first display option, the intelligent agenda is modified to display only the title in the outline corresponding to the currently displayed slide, a preceding title located immediately before the title, and a following title located immediately after the title, and when the user selects the second display option, the intelligent agenda is modified to display a portion of the plurality of titles that precede the title subject to the line limitation, and then only when the line limitation has not been met, display a portion of the plurality of titles that follow the title until the line limitation is met.

12. The computer program product of claim 11, where the computer readable program code when executed on the computer further causes the computer to:
    allow the user to select a third display option, wherein, when the user selects the third display option, limit a portion of the plurality of titles to be displayed in the outline to either the portion of the plurality of titles that precede the title, or to the portion of the plurality of titles that follow the title, and subject to the line limitation.

13. The computer program product of claim 11, where the intelligent agenda program is further adapted to modify the outline to display a duration associated with each slide of the plurality of slides represented within the outline via the graphical user interface on the display as a portion of the outline.

14. The computer program product of claim 11, where the intelligent agenda program is further adapted to modify at least one of a color of the outline, a size of the outline, a layout of the outline, and a picture associated with the outline.

15. The computer program product of claim 11, where the intelligent agenda program is further adapted to accept a user configured format of the outline and to display the outline on the plurality of slides in the user configured format.

16. The computer program product of claim 15, where the intelligent agenda program is further adapted to:
    determine whether the user has configured a display option; and
    responsive to the determination that the user has not configured the display option, display the outline with all titles in the outline expanded.

17. The computer program product of claim 15, where the intelligent agenda program is further adapted to:
    determine whether the user has configured a display option; and responsive to the determination that the user has configured the display option, determine whether the user has selected an outline expansion option; and responsive to the determination that the user has selected the outline expansion option, display the outline according to the outline expansion option selected by the user.

18. The computer program product of claim 15, where the intelligent agenda program is further adapted to:

determine whether the user has configured a display option; and responsive to the determination that the user has configured the display option, determine whether the user has limited the number of displayed lines on the outline; and responsive to the determination that the user has limited the number of lines on the outline, modify the outline to the number of displayed lines limited by the user.

19. The computer program product of claim 15, where the intelligent agenda program is further adapted to:

determine whether the user has configured a display option; and responsive to the determination that the user has configured the display option, determine whether the user has limited a type of displayed topics on the outline; and responsive to the determination that the user has limited the type of displayed topics on the outline, modify the outline to the type of displayed topics limited by the user.

20. The computer program product of claim 15, where the user configured format comprises a format selected from a group consisting of:

a color and a line associated with the outline;
a size of the outline;
a layout of the outline;
a picture associated with the outline;
a text box associated with the outline; and
a web message associated with the outline.

* * * * *